(12) United States Patent
Tanaka et al.

(10) Patent No.: US 9,383,002 B2
(45) Date of Patent: Jul. 5, 2016

(54) OPERATION VEHICLE TRAVEL CONTROL DEVICE

(71) Applicant: Hitachi Construction Machinery Co., Ltd., Bunkyo-ku, Tokyo (JP)

(72) Inventors: Tetsuji Tanaka, Tsuchiura (JP); Masaki Yoshikawa, Tsuchiura (JP); Nobuyuki Hidaka, Tsuchiura (JP); Isamu Aoki, Tsuchiura (JP); Keigo Kikuchi, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/427,837

(22) PCT Filed: Oct. 11, 2013

(86) PCT No.: PCT/JP2013/077810
§ 371 (c)(1),
(2) Date: Mar. 12, 2015

(87) PCT Pub. No.: WO2014/061602
PCT Pub. Date: Apr. 24, 2014

(65) Prior Publication Data
US 2015/0226316 A1    Aug. 13, 2015

(30) Foreign Application Priority Data
Oct. 19, 2012   (JP) ................. 2012-231425

(51) Int. Cl.
| | |
|---|---|
| F16H 59/00 | (2006.01) |
| F16H 59/04 | (2006.01) |
| B60K 20/02 | (2006.01) |
| F16H 59/02 | (2006.01) |

(52) U.S. Cl.
CPC ............. *F16H 59/044* (2013.01); *B60K 20/02* (2013.01); *F16H 59/02* (2013.01); *F16H 59/0204* (2013.01); *B60Y 2200/411* (2013.01)

(58) Field of Classification Search
None
See application file for complete search history.

(56) References Cited

U.S. PATENT DOCUMENTS

| | | |
|---|---|---|
| 5,012,698 A | 5/1991 | Hayasaki |
| 2006/0185457 A1 | 8/2006 | Yoshikawa et al. |
| 2010/0069199 A1 | 3/2010 | Hyodo et al. |

FOREIGN PATENT DOCUMENTS

| | | |
|---|---|---|
| JP | 57-176339 U | 11/1982 |
| JP | 3-20158 A | 1/1991 |
| JP | 5-41056 Y2 | 10/1993 |

(Continued)

OTHER PUBLICATIONS

International Search Report (PCT/ISA/210) dated Jan. 14, 2014, with English translation (Four (4) pages).

*Primary Examiner* — Dirk Wright
(74) *Attorney, Agent, or Firm* — Crowell & Moring LLP

(57) ABSTRACT

To provide a travel control device for a working vehicle, including a speed change lever that is applicable even when a transmission in which speed stages are set to be larger by one stage is applied, the travel control device comprises a switching device (41) that switches speed changed by a transmission (3) either manually or automatically, a speed stage selecting device (30b) that selects a speed stage out of a plurality of speed stages of the transmission (3), and a first speed selecting device (40) that changes the speed stage manually down to a first speed separately from the speed stage selecting device (30b), regardless of a switching state of the switching device (41), wherein the speed stage selecting device (30b) selects the speed stages including a second speed or more but excluding the first speed, and a control device (10) is further provided, which controls the transmission (3) based on instructions sent from the switching device (41), the speed stage selecting device (30b), and the first speed selecting device (40).

2 Claims, 4 Drawing Sheets

(56) References Cited

FOREIGN PATENT DOCUMENTS

| | | |
|---|---|---|
| JP | 10-121522 A | 5/1998 |
| JP | 63-151315 U | 10/1998 |
| JP | 2006-240576 A | 9/2006 |
| JP | 2006-283772 A | 10/2006 |
| JP | 2011-157972 A | 8/2011 |
| JP | 5061120 B2 | 10/2012 |

OPERATION VEHICLE TRAVEL CONTROL DEVICE

TECHNICAL FIELD

The present invention relates to a travel control device for a working vehicle including a transmission, which is applied to a working vehicle such as a wheel loader.

BACKGROUND ART

Conventionally, a working vehicle such as a wheel loader in which ranges of automatic speed change are set so as to correspond respectively to each speed stage position at each speed stage of a speed change lever has been known. In the conventional technique above, in order to save energy of power in a reversing motion without involving work, for example, the respective ranges of automatic speed change at the speed stage positions, ranging from the first speed to the third speed, of the speed change lever, out of the reverse speed stage positions that are set in a range of the first speed to the fourth speed at the maximum, are set so as to be changed within a range of the speed stages in which a speed stage that is larger by one stage is added to the speed stages corresponding to the speed stage positions ranging from the first speed at the minimum to the third speed.

Prior Art Document

Patent Document

Patent Document 1: Japanese Patent Application Laid-Open No. 2006-283772 A

SUMMARY

Problems to be Solved by the Invention

In the conventional technique above, when the fourth speed stage position of forwarding or reversing side of the speed change lever is selected, the automatic speed change is performed in a range between the first speed to the fourth speed. With this configuration, if a transmission in which speed stages are set to be larger by one stage than a transmission having four speed stages, for example, the one in which the first speed to the fifth speed are set is to be applied, it is necessary to newly prepare a speed change lever that corresponds to the first speed to the fifth speed.

The present invention was made in view of such problems stemming from the conventional technique described above, and an object of the present invention is to provide a travel control device for a working vehicle, including a speed change lever that is applicable to even a transmission in which speed stages are set to be larger by one stage.

Means for Solving the Problem

In order to achieve the object described above, the present invention provides a travel control device for a working vehicle provided with a driving source, a torque converter that amplifies a torque transmitted from the driving source, and a transmission that transmits the torque that has been amplified and output by the torque converter to perform speed change, the travel control device comprising: a switching device that switches speed changed by the transmission into either manual speed change or automatic speed change; a speed stage selecting device that is arranged to select a speed stage out of a plurality of speed stages of the transmission; and a first speed selecting device that is arranged to change the speed stage manually down to a first speed separately from the speed stage selecting device, regardless of a switching state of the switching device, wherein the speed stage selecting device is arranged to select the speed stages including a second speed or more but excluding the first speed, and a control device is further provided, which is arranged to control the speed change performed by the transmission based on instructions sent from the switching device, the speed stage selecting device, and the first speed selecting device.

Furthermore, the travel control device for a working vehicle according to the present invention is configured such that the control device is arranged to control the speed change with setting the speed stage that has been selected by the speed stage selecting device as an upper limit, in a state where the switching device is switched into the automatic speed change.

Effect of the Invention

According to the present invention, manual speed change to the first speed is performed by an operation of a first speed selecting device, and speed stages excluding the first speed are assigned to a speed stage selecting device. With this configuration, it is possible to commonly use the speed stage selecting device even when a transmission in which speed stages are set to be larger by one stage is applied.

BRIEF DESCRIPTION OF DRAWINGS

FIG. 4A is an enlarged side view thereof and FIG. 4B is a front view thereof.

DESCRIPTION OF EMBODIMENTS

Hereinafter, an embodiment of a tank fixing structure for a working machine according to the present invention will be described with reference to the drawings.

Figure 1:
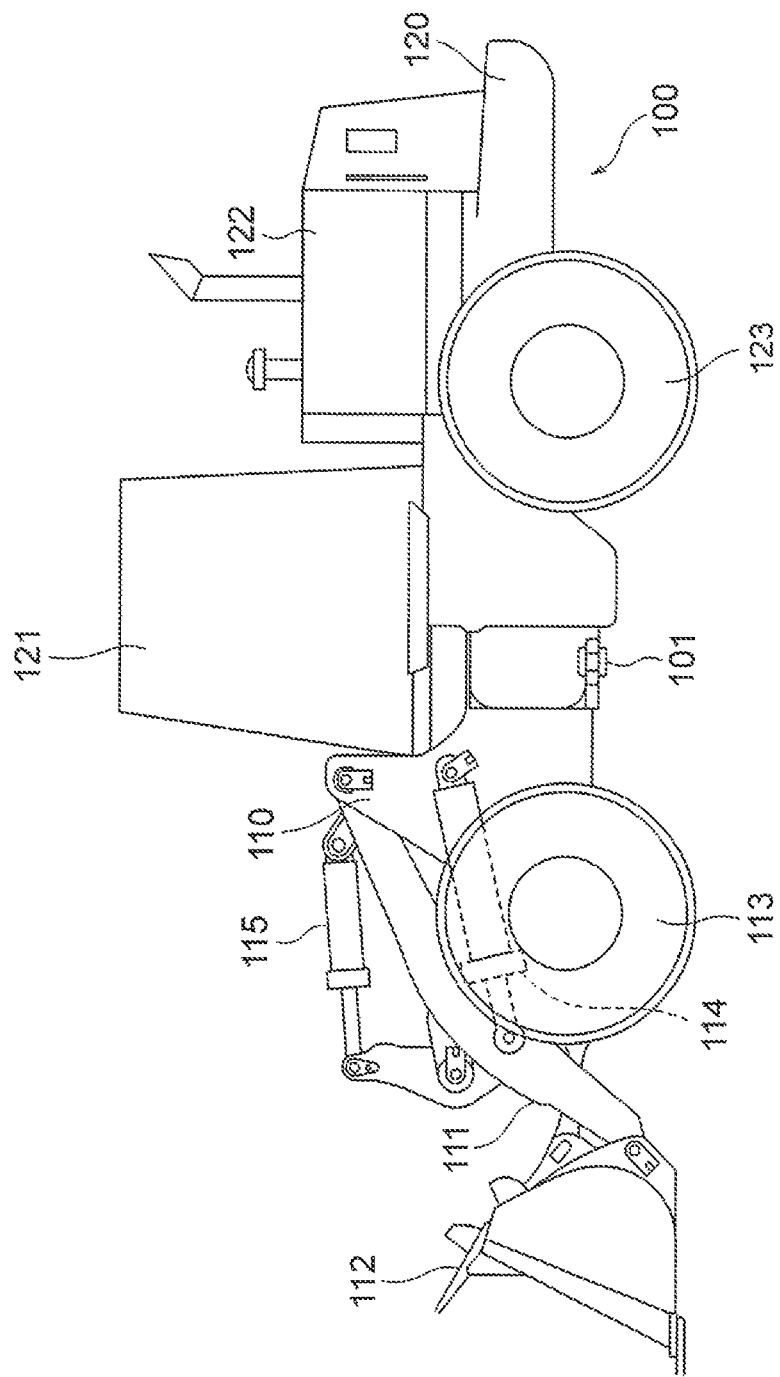
FIG. 1 is a side view of the entire structure of a wheel loader according to an embodiment of the present invention.
Figure 2:
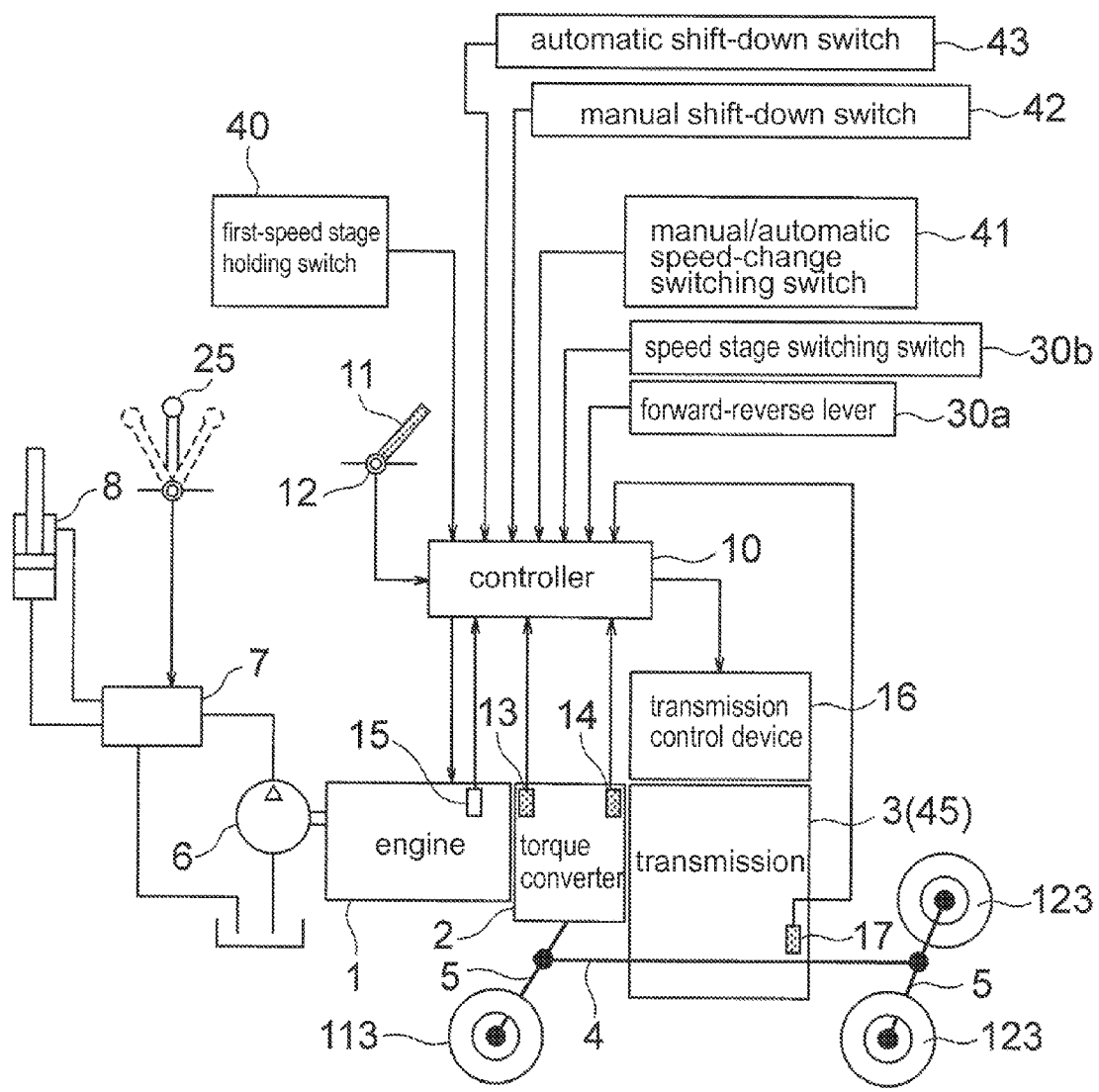
FIG. 2 is a schematic block diagram of a speed change control device according to the present embodiment.
Figure 3:
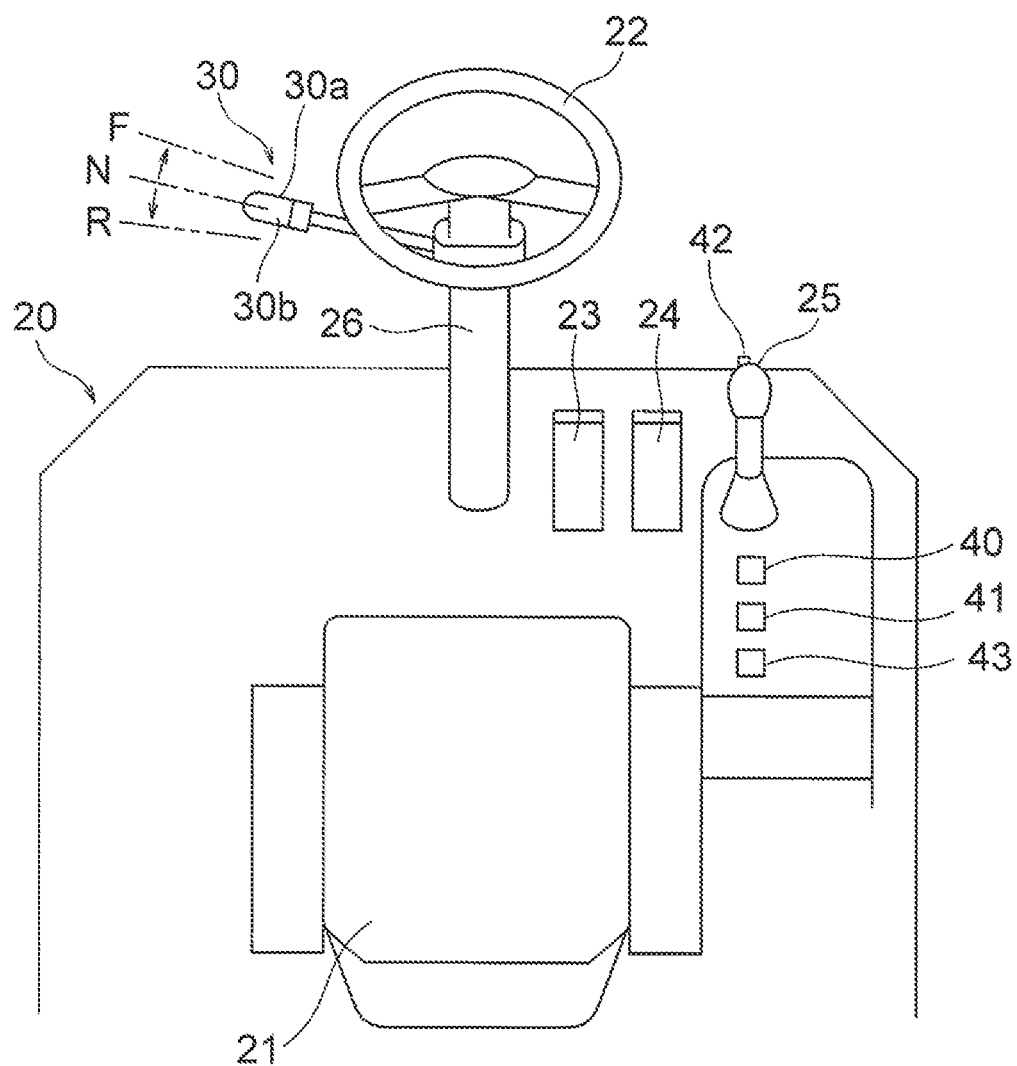
FIG. 3 is a top view of an area near an operator's seat of a wheel loader according to an embodiment of the present invention.
Figure 4A:
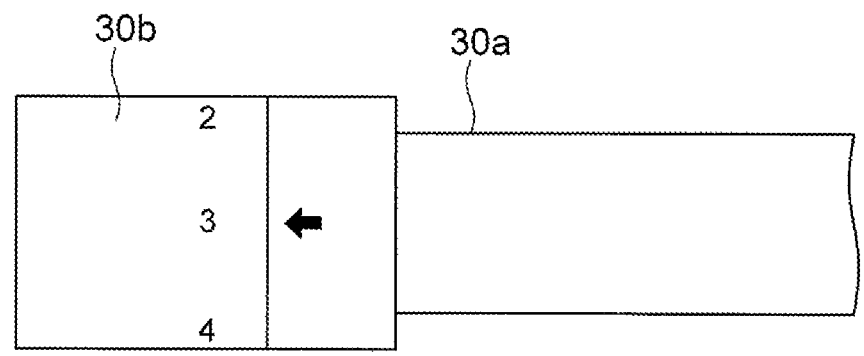
FIGS. 4A and 4B illustrates a speed change lever according to the present invention, especially.
Figure 4B:
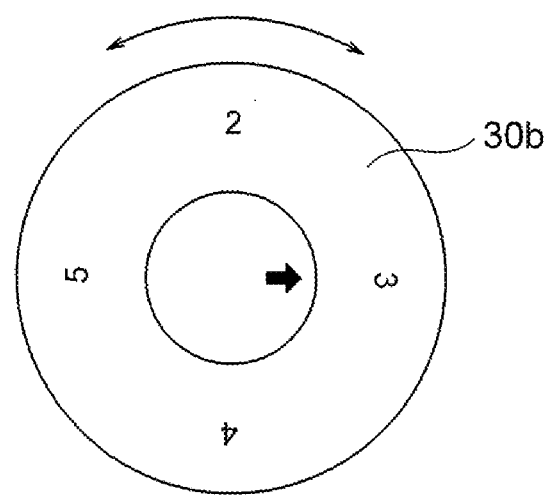

FIG. 1 is a side view of the entire structure of a wheel loader according to an embodiment of the present invention. FIG. 2 is a schematic block diagram of a speed change control device according to the present embodiment. FIG. 3 is a top view of an area near an operator's seat of a wheel loader according to an embodiment of the present invention. FIG. 4 illustrates a speed change lever according to the present invention, especially, FIG. 4A is an enlarged side view thereof and FIG. 4B is a front view thereof. Hereinafter, for convenience, the left side of FIG. 3 is referred as the left side and the right side of FIG. 3 is referred as the right side.

A wheel loader 100 is provided with a front vehicle body 110 that includes an arm 111, a bucket 112 as a working machine device, and tires 113, etc. and a rear vehicle body 120 that includes an operator's cab 121, an engine room 122, and tires 123, etc. The arm 111 is rotated in a vertical direction (in an elevating motion) by driving an arm cylinder 114, and the bucket 112 is rotated in a vertical direction (dumping or crowding operation) by driving a bucket cylinder 115. The front vehicle body 110 and the rear vehicle body 120 are rotatably connected with each other by a center pin 101, and the front vehicle body 110 is bended from side to side with respect to the rear vehicle body 120 by expansion and contraction of a steering cylinder (not shown).

FIG. 2 is a schematic block diagram of a speed change control device according to the present embodiment. An output shaft of an engine 1 is connected to an input shaft (not shown) of a torque converter 2, and an output shaft (not shown) of the torque converter 2 is connected to a transmission 3. The torque converter 2 is a fluid clutch that includes a known impeller, turbine, and stator, and rotation of an engine 1 is transmitted to the transmission 3 via the torque converter 2. The transmission 3 includes a hydraulic clutch that changes a speed stage between the first speed to the fifth speed, and rotational speed of the output shaft of the torque converter 2 is changed by the transmission 3. The rotation after the speed change is transmitted to the tires 113 and tires 123 via a propeller shaft 4 and an axle 5, and thus the wheel loader 100 travels. An engine speed of the engine 1 is detected by an engine speed sensor 15. The input shaft of the torque converter 2 is provided with a rotational speed sensor 13, the output shaft of the torque converter 2 is provided with a rotational speed sensor 14, and the propeller shaft 4 is provided with a rotational speed sensor 17 that detects vehicle speed.

A hydraulic pump 6 for work is driven by the engine 1 and oil discharged from the hydraulic pump 6 is guided to an actuator 8 for work (for example, the arm cylinder 114) via a directional control valve 7. The directional control valve 7 is driven by a working machine lever 25 and drives the actuator 8 according to an operation amount of the working machine lever 25.

The torque converter 2 has a function to increase an output torque with respect to an input torque, i.e., a function to make the torque ratio 1 or larger. The torque ratio decreases with an increase in the torque converter speed ratio e (=Nt/Ni). which is a ratio of the rotation speed Nt of the output shaft to the rotation speed Ni of the input shaft 21 of the torque converter 2. For example, if a travel load is increased while the vehicle is in motion in a state where the engine speed is constant, the rotation speed of the output shaft of the torque converter 2, i.e., the vehicle speed is reduced and the torque converter speed ratio e is decreased. At this time, because the torque ratio is increased, the vehicle is allowed to travel with a greater travel driving force (traction force).

The transmission 3 includes solenoid valves 45 that correspond to each speed stage. The solenoid valves 45 are driven by a control signal output from a controller 10 to a transmission control device 16, and then the speed stages are changed between the first speed to the fifth speed. In the present embodiment, the speed stages of the transmission 3 are set, for example, between the first speed stage to the fifth speed stage.

There are two types of automatic transmission control, i.e., torque converter speed ratio reference control, in which the speed changes when the torque converter speed ratio e reaches a predetermined value, and vehicle speed reference control, in which the speed changes when the vehicle speed reaches a predetermined value. In the present embodiment, the speed stages of the transmission 3 are controlled through the torque converter speed ratio reference control.

FIG. 3 is a top view of an area near an operator's seat of the wheel loader.

As illustrated in FIG. 3, the operator's cab 20 of a working vehicle is provided therein with an operator's seat 21 on which an operator sits, a steering wheel 22 for steering the working vehicle, an accelerator pedal 24, a brake pedal 23, and the working machine lever 25 for operating a working machine device. The operator's seat 21 is arranged nearly at the center of the operator's cab 20. The steering wheel 22 is arranged at the front of the operator's seat 21. The accelerator pedal 23 and the brake pedal 24 are arranged side by side in a right and left direction at aside of a base end part of a steering column 26 that supports the steering wheel 22. The working machine lever 25 is arranged at the front end of a top surface of a console 27 that is placed at the right side of the operator's seat 21.

The operator's cab 20 is further provided with a forward-reverse lever device 30 including a forward-reverse lever 30a that projects outwardly from the steering column 26 at the lower part of the steering wheel 22 and is arranged to be switched manually. In accordance with a switching operation of the forward-reverse lever 30a, the forward-reverse lever device 30 outputs a forward instruction signal for instructing the vehicle to forward, a reverse instruction signal for instructing the vehicle to reverse, and a neutral instruction signal for instructing the vehicle to be neutral. The forward-reverse lever 30a is configured to be switchable between a forward position F which instructs the vehicle to forward, a reverse position R which instructs the vehicle to reverse, and a neutral position N which instructs the vehicle to be neutral, and can be held at the respective positions F, R, or N.

The positional relationship between the forward-reverse lever 30a and the working machine lever 25 is set such that the forward-reverse lever 30a projects from the steering column 27 toward the left side and the working machine lever 25 is arranged at the right side of the operator's seat 21. That is, the forward-reverse lever 30a and the working machine lever 25 are placed as above so that the forward-reverse lever 30a and the steering wheel 22 can be operated with the left hand of an operator, and the working machine lever 25 can be operated with the right hand thereof.

Furthermore, the forward-reverse lever 30a is provided at its free end side with a speed stage switching switch 30b having a function as a speed change lever. For example, FIG. 4 illustrates a state where the third speed is selected. The speed stage switching switch 30b is a dial typed switch and is configured to be switchable between the four speed stages excluding the first speed, which is different from the conventional speed change lever, as described later.

The console 27 is further provided thereon, other than the working machine lever 25, with a first-speed-stage holding switch 40, a manual/automatic speed-change switching switch 41, a manual shift-down switch 42, and an automatic shift-down switch 43.

The first-speed-stage holding switch 40 is placed near the working machine lever. When the wheel loader runs into the natural ground and excavates soil and sand, the first-speed-stage holding switch 40 is turned on so that the speed stage is held at the first speed and a high torque is output for a predetermined time period to enable excavation work. Even if excavation work is not performed, when a traction force is required during, for example, uphill traveling, the first-speed-stage holding switch 40 is turned on so that a high torque is output for a predetermined time period.

The manual/automatic speed-change switching switch 41 is configured to be switchable between manual speed change that can change the speed stage manually and automatic speed change that can change the speed stage automatically. When the manual speed change is selected, the controller 10 that will be described later controls so as to hold the speed stage at the speed stage which has been selected by the speed stage switching switch 30b. On the other hand, when the automatic speed change is selected, the controller 10 that will be described later controls so as to perform the automatic speed change based on information (vehicle speed) detected by the rotational speed sensor 17 which will be described later, with setting the speed stage that has been selected by the speed stage switching switch 30b as an upper limit.

The manual shift-down switch 42 is located near or on the working machine lever. Every time the manual shift-down switch 42 is pressed on, the speed stage is changed down stage by stage to the first speed stage that is the minimum. In the state where the speed stage is changed down to the first speed stage by the switching operation above, when forward-reverse operations are switched by the forward-reverse lever 30a, the state in which the first speed is held is unlocked and then the vehicle starts to travel at the second speed.

The automatic shift-down switch 43 is set so as to enter a mode in which the speed stage is changed automatically down to the first speed when the automatic shift-down switch 43 is turned on. When turning the automatic shift-down switch 43 off, the automatic shift-down switch 43 is set such that the speed stage is changed automatically down only to the second speed. The automatic shift-down switch 43 is also set such that, regardless of whether the automatic shift-down switch 43 is pressed on or off, an operation by the manual shift-down switch 42 has a priority when the manual shift-down switch 42 is pressed on.

When the first speed is selected by the manual shift-down switch 42 and the automatic shift-down switch 43, if a load on the working machine (load during excavation work or uphill traveling) becomes equal or less than a predetermined value, the speed stage is changed automatically up to the second speed.

Hereinafter, the main part of the present invention is described.

The speed stage switching switch 30b includes the four speed stages ranging from the second speed to the fifth speed out of the five speed stages. The less frequently used first speed stage, which is used during a specific operation such as excavation work or uphill traveling, is not assigned to the speed stage switching switch 30b because, the speed can be changed to the first speed stage and held as it is by turning on the first-speed-stage holding switch 40. That is, because the speed stage switching switch 30b includes the speed stages excluding the first speed, the speed stage switching switch 30b that is to be applied to a transmission having four speed stages ranging from the first speed to the fourth speed can be commonly used even when a transmission having five speed stages in which speed stages are larger by one stage is applied. The first speed is less frequently used, nevertheless, when the vehicle works at a narrow site, there is a case where movement at the ultralow speed is only allowed, and in such a case, because the vehicle can travel in a state where the speed stage is held at the first speed by the first-speed-stage holding switch 40, the vehicle can work even within the narrow site while suppressing the speed.

Referring to FIG. 2 again, a signal input-output relationship of a controller provided in a wheel loader according to an embodiment of the present invention is described below.

The reference sign 10 indicates a main controller. Signals which will be described later are respectively input in the controller 10, and after the signals are operated in the controller 10, they are output to each of the solenoid valves 45 via the transmission control device 16 that is configured to control transmission. The controller 10 is configured to receive a signal corresponding to selection of any one of forwarding, reversing, or neutral motions, as a signal sent from the forward-reverse lever 30a. Moreover, the controller 10 is configured to receive the speed stage that has been currently selected, as a signal sent from the forward-reverse lever 30a, and also receive an instruction signal sent from the manual shift-down switch 42. Furthermore, the controller 10 is configured to receive an instruction signal sent from the first-speed-stage holding switch 40, a signal which corresponds to one of the manual speed change or automatic speed change as a signal sent from the manual/automatic speed-change switching switch 41, and an instruction signal sent from the automatic shift-down switch 43. The controller 10 is configured to receive signals sent from a pedal operation amount sensor 12 that detects operation amount of an accelerator pedal 11 as well as each of sensors 13, 14, 15, and 17. The controller 10 is configured to output signals to the solenoid valves 45 that controls a forward clutch, a reverse clutch, and each of speed stage clutches (not shown either) via the transmission control device 16.

FIG. 4 illustrates a speed stage switching switch according to the present invention, which serves as a speed change lever, especially, FIG. 4A is an enlarged side view seen from an operator' side and FIG. 4B is a front view seen from a free end side. As illustrated in FIG. 4A and FIG. 4B, the four speed stages are assigned to the dial typed speed stage switching switch 30b that is located at an end portion of the forward-reverse lever 30a. More particularly, the speed stages ranging from the second speed to the fifth speed are assigned thereto in a selectable manner.

Next, a manual speed change operation of the wheel loader according to the present embodiment configured as above is described below.

When an operator sitting on the operator's seat in the operator's cab 121 starts an engine, switches the manual/automatic speed-change switching switch 41 to manual speed change control, switches the forward-reverse lever 30a to forwarding, and then steps down the accelerator pedal 24, the wheel loader 100 starts to travel at the second speed. When the vehicle speed increases from this state, the operator operates the speed stage switching switch 30b in accordance with the vehicle speed to change the speed stage up to the third speed, and further in accordance with increase in the vehicle speed, the operator operates the speed stage switching switch 30b to change the speed stage up to the fourth speed and then to the fifth speed.

As the wheel loader 100 travels closer to the natural ground to be excavated, the operator operates the speed stage switching switch 30b to change the speed stage gradually down to the fourth speed, to the third speed, and then to the second speed. Moreover, when the bucket runs into the natural ground or immediately in front of the natural ground, in order to demonstrate an excavation force, the operator turns on the first-speed-stage holding switch 40 to change the speed stage down to the first speed. Thereafter, the operator operates the working machine lever 25 to make the bucket 112 and the arm 111 move so that the excavated soil and sand are held within the bucket 112. The operator switches the forward-reverse lever 30a to reversing to make the wheel loader reverse-travel at the second speed, and then switches the forward-reverse lever 30a to forwarding to make the wheel loader forward-travel at the second speed toward a dump truck (not shown). Thereafter, when the operator operates the speed stage switching switch 30b to change the speed stage up, the wheel loader travel closer to the dump truck while the speed stage is changed down to the second speed. The operator then operates the working machine lever 25 so that the soil and sand that has been held in the bucket 112 is discharged on a loading platform of the dump truck.

Next, an automatic speed change operation of the wheel loader according to the present embodiment configured as above is described below.

When the operator switches the manual/automatic speed-change switching switch 41 to automatic speed change control and steps down the accelerator pedal 24, the wheel loader 100 starts to travel at the second speed. The controller performs appropriate automatic speed change based on information (vehicle speed) detected by the rotational speed sensor 17, with setting the speed stage that has been selected by the speed stage switching switch 30b as an upper limit, to change the speed stage up or down.

According to the present embodiment described above, the following advantageous effects can be obtained.

In the present embodiment, manual speed change to the first speed can be performed by an operation of the first-speed stage holding switch or an operation of the automatic shift-down switch which changes the speed stage from the second speed while the speed stages excluding the first speed are assigned to the speed stage switching switch 30b. Accordingly, it is possible to commonly use the speed stage switching switch 30b that is applicable to a transmission having four speed stages ranging from the first speed to the fourth speed even when a transmission in which speed stages are set to be larger by one stage is applied, and thereby, it is possible to reduce the number of components. With this configuration, a transmission in which speed stages are set to be larger by one stage is applied can be even configured such that each of the speed stages can be optionally selected.

In the present embodiment, an example of a case where the speed stage switching switch 30b having four speed stages is applied to the transmission having five speed stages is explained. However, the present invention is not limited to the present embodiment. For example, a speed stage switching switch having two speed stages can be applied to a transmission having three speed stages, a speed stage switching switch having three speed stages can be applied to a transmission having four speed stages, and a speed stage switching switch having five speed stages can be applied to a transmission having six speed stages.

In this connection, the numbers for each of the speed stages on the speed stage switching switch 30b are shown by attaching decals. Accordingly, when commonly using the speed stage switching switch 30b for a transmission in which speed stages are set to be larger by one stage, the decals can be stuck thereon such that the numbers of the respective speed stages and the sticking position thereof on the speed stage switching switch 30b correspond to the transmission in which speed stages are set to be larger by one stage.

In the present embodiment, an example of a case where the dial typed speed stage switching switch 30b is explained, however, the speed stage switching switch 30b is also applicable to a lever typed speed change lever.

EXPLANATION OF REFERENCES 10 controller
25 working machine lever
30a forward-reverse lever
30b speed stage switching switch (speed stage selecting device)
40 first-speed stage holding switch (first speed selecting device)
41 manual/automatic speed-change switching switch (first speed selecting device)
43 automatic shift-down switch (first speed selecting device)
100 wheel loader
111 arm
112 bucket
121 operator's cab

The invention claimed is:

1. A travel control device for a working vehicle (100) provided with a driving source (1), a torque converter (2) that amplifies a torque transmitted from the driving source (1), and a transmission (3) that transmits the torque that has been amplified and output by the torque converter (2) to perform speed change, the travel control device comprising:
   a switching device (41) that switches speed changed by the transmission (3) into either manual speed change or automatic speed change;
   a speed stage selecting device (30b) that is arranged to select a speed stage out of a plurality of speed stages of the transmission (3); and
   a first speed selecting device (43) that is arranged to change the speed stage manually down to a first speed separately from the speed stage selecting device (30b), regardless of a switching state of the switching device (41), wherein
   the speed stage selecting device (30b) is arranged to select the speed stages including a second speed or more but excluding the first speed, and
   a control device (10) is further provided, which is arranged to control the speed change performed by the transmission based on instructions sent from the switching device (41), the speed stage selecting device (30b) and the first speed selecting device (43).

2. The travel control device for a working vehicle (100) according to claim 1, wherein the control device (10) is arranged to control the speed change with setting the speed stage that has been selected by the speed stage selecting device (30b) as an upper limit, in a state where the switching device (41) is switched into the automatic speed change.

* * * * *